US012773783B2

(12) United States Patent
Beardsworth

(10) Patent No.: US 12,773,783 B2
(45) Date of Patent: Oct. 27, 2026

(54) SKILLS FOR SAFETY IN ROBOTIC CONTROL SYSTEMS

(71) Applicant: Intrinsic Innovation LLC, Mountain View, CA (US)

(72) Inventor: Michael Beardsworth, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 18/815,770

(22) Filed: Aug. 26, 2024

(65) Prior Publication Data

US 2026/0054387 A1 Feb. 26, 2026

(51) Int. Cl.
*B25J 9/16* (2006.01)

(52) U.S. Cl.
CPC ........... *B25J 9/1674* (2013.01); *B25J 9/1661* (2013.01); *B25J 9/1679* (2013.01)

(58) Field of Classification Search
CPC ....... B25J 9/1674; B25J 9/1661; B25J 9/1679
See application file for complete search history.

(56) References Cited

U.S. PATENT DOCUMENTS

2022/0355482 A1* 11/2022 Denenberg ............... G01V 8/00

* cited by examiner

*Primary Examiner* — Wade Miles
*Assistant Examiner* — Zachary Joseph Wallace
(74) *Attorney, Agent, or Firm* — Fish & Richardson P.C.

(57) ABSTRACT

Methods, systems, and apparatus, including computer programs encoded on computer storage media, for executing one or more actions based on a safety skill. One of the methods comprises receiving, by a robotics control system, a skill that defines actions to be performed by a robot controlled by the robotics control system, where the skill specifies one or more safety constraints that represent safety conditions that must be satisfied before the robotics control system can execute the actions on the robot; populating, by the robotics control system, a safety database with the safety constraints specified by the skill; initiating execution of the skill by the robot; determining, by a safety control subsystem of the robotics control system, that the safety conditions specified by the skill have not been satisfied; and in response, modifying, by the robotics control system, execution of the actions defined by the skill.

20 Claims, 3 Drawing Sheets

SKILLS FOR SAFETY IN ROBOTIC CONTROL SYSTEMS

BACKGROUND

This specification relates to frameworks for robotics control systems.

Robotics control systems are software control systems that can control robots using robotics planning. Robotics planning refers to scheduling the physical movements of robots in order to perform tasks in an execution environment. For example, a robotics control system can execute operations for an industrial robot that builds cars to first pick up a car part and then weld the car part onto the frame of the car.

Because modern industrial robots are heavy and can move quickly, many types of robotic operations and actions implicate safety concerns for operators of the robot. Therefore, many robotic control systems are equipped with safety control systems that monitor execution of a robot and halt execution if a dangerous situation arises. For example, a camera or a sensor can be used to detect when a human enters a restricted area while a robot is in operation. In response, a safety control system can halt execution of the robot. These safety systems are typically manually and tediously hand coded by operators of the robotic control system, who have the most familiarity with the robotic process being developed.

SUMMARY

This specification describes a robotics control system that can execute skills having encoded safety constraints. A skill to perform a particular robotic operation can be generated by an outside skill developer. The skill developer is typically an expert who has the most knowledge about the robotic behavior they wish to encode. Accordingly, they are also typically an expert in the hazardous conditions that can arise when executing the robotic operation and the requirements a safety system must meet to address the hazards. The systems and techniques described in this specification allow a skill developer to encode safety constraints into the skill itself. The robotics control system can then automatically configure a safety control system using the encoded safety constraints so that the robotic operation can be performed while the safety control system monitors its execution according to the safety constraints defined by the skill developer.

As used in this specification, a skill is a software artifact that when installed and executed by a robotics control system implements one or more actions for a robot or other piece of automation equipment. Importantly, a skill can be developed by an outside entity that has no affiliation with the entity operating the installation of the robotics control system. The systems and techniques described in this specification allow the skill developer to specify explicit or implicit safety constraints for the actions performed by the robot. The skill can for example include information about certain safety conditions that must be met in order for the robotics control system to execute the actions on the robot. If such conditions are not met, the robotics control system can raise an error and refuse to execute the skill. This allows the system to enforce the safety constraints while executing one or more actions defined by the skill.

For example, a safety constraint may specify a constraint on the usage of volumes of physical space within a robot's work envelope. For example, a particular section of an execution environment may be relatively hazardous to enter during a particular action of a robot. A user can define the skill to include a volume constraint of the hazardous section, where humans or other robots are not allowed to enter.

In another example, the safety constraints may be associated with a kinematic or dynamic constraint on the motion operations defined by the skill to be performed by the robot. For example, movement of the robot or the velocity, acceleration, jerk, or torque of a movement of the robot may be relatively hazardous to a human or other robots in the execution environment. A user can define the skill to include kinematic or dynamic constraints for parameters of the movement of the robot or the velocity, acceleration, jerk, or torque of the movement. Additionally, these constraints might be specified in the task space of the robot, or with respect to the pose of any part of the robot's kinematic model.

If the safety constraints defined by the skill are not met, the robotics control system can modify the one or more actions performed by the robot based on the skill defined by the skill developer. For example, the system can halt execution of the operations of the robot, or the system can perform a recovery action. As described in this specification, a recovery action can include executing a different operation of the robot.

Particular embodiments of the subject matter described in this specification can be implemented so as to realize one or more of the following advantages. In some existing systems, when executing a skill included in a user-defined behavior tree, a robot can automatically execute a stop in response to a malfunction. However, in many situations such a policy is sub-optimal, and even unsafe, if the safety considerations are not fully appreciated by the robotic control system operators. By allowing the safety constraints to be directly encoded into a skill itself, an expert on the properties of the skill is involved in defining the safety considerations of the skill, and they are executed automatically.

Using techniques described in this specification, a system can adaptively use a skill defined by a skill developer to implement safety constraints for operations of robots in an execution environment, allowing the system to efficiently ensure safe control of the execution environment while executing the skill. For example, the system can use recent sensor data captured from the execution environment (e.g., live sensor data or sensor data captured just before the emergency situation) to determine whether the safety constraints are violated by the robot, other robots, or a user. If so, the system can automatically halt execution according to the safety constraints provided by the skill developer.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
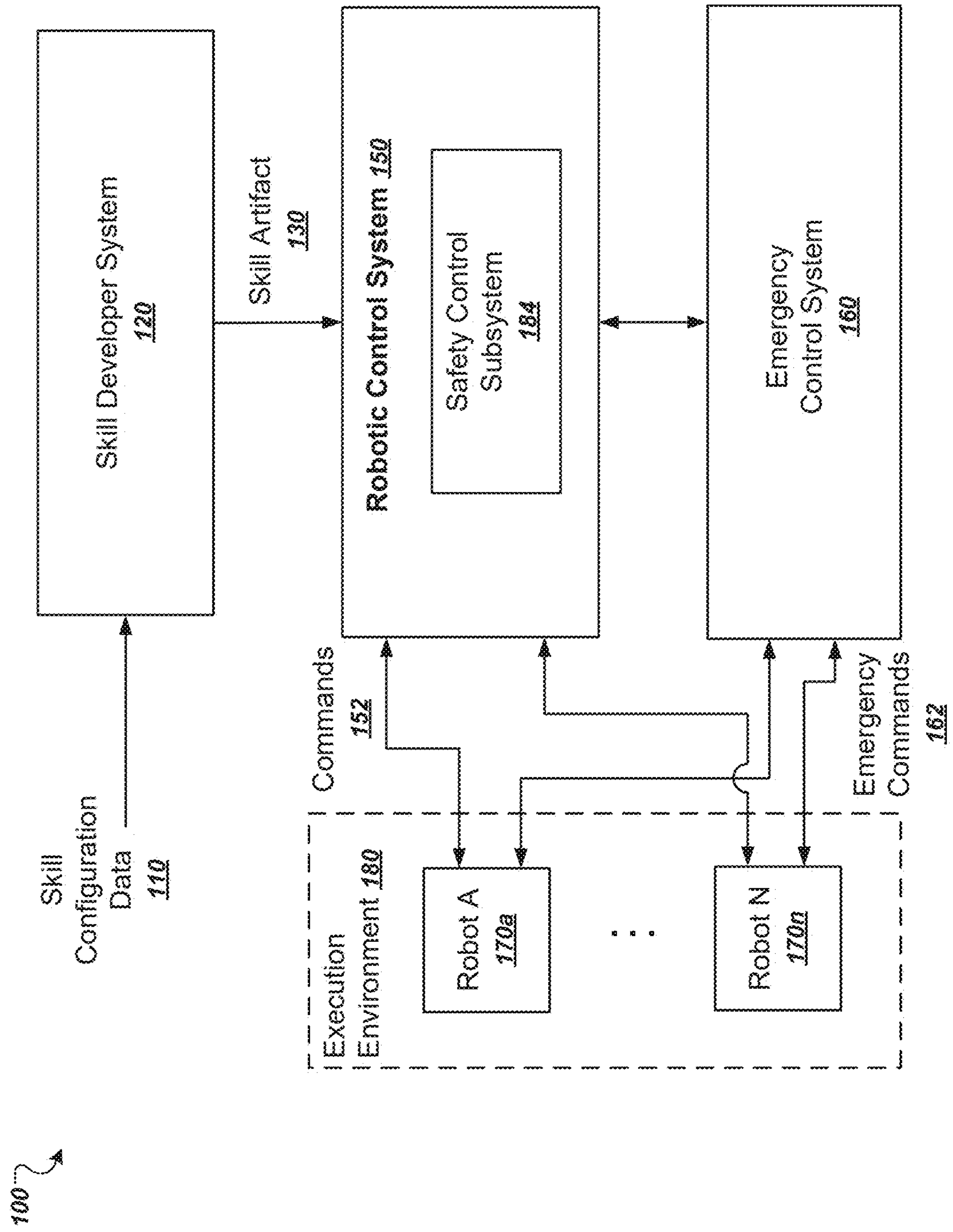
FIG. 1 is a diagram that illustrates an example system.

FIG. 1 is a diagram that illustrates an example system 100. The system 100 is an example of a system that can implement the techniques described in this specification.

The system 100 includes a number of functional components, including a skill developer system 120, a robotic control system 150, and an emergency control system 160. Each of these components can be implemented as computer programs installed on one or more computers in one or more locations that are coupled to each other through any appropriate communications network, e.g., an intranet or the Internet, or combination of networks. The system 100 also includes an execution environment 180 that includes N robotic components 170*a-n*, N≥1.

The robotic control system 150 is configured to control the robotic components 170*a-n* in the execution environment 180 to execute a task. In some implementations, the robotic control system 150 is a real-time robotic control system. That is, the robotic control system 150 must satisfy one or more "hard" time constraints in the operation of the execution environment 180. For example, one of the robots in the execution environment 180 may be required to perform a certain operation at regular intervals, e.g., 10 milliseconds; if the robot ever fails to execute the operation in a given time window, then the robot enters a fault state. In some other implementations, the robotic control system 150 must only satisfy "soft" time constraints, where a missed operation does not always necessitate the robot to enter a fault state.

The overall goal of the skill developer system 120 is to generate a skill artifact 130 that allows the robotic control system 150 to control the robotic components 170*a-n* in the execution environment 180 in order to execute the required task.

In some examples, the skill developer system 120 can be configured to generate the skill artifact 130 using skill configuration data 110 that identifies the task to be completed by the robotic components 170*a-n* (e.g., robots 170*a-n*). The skill configuration data 110 can have any appropriate format, and can define any parameter of the task execution.

In some implementations, the skill configuration data 110 include information defining a skill, where the skill is a node of a behavior tree or a part of a behavior tree defined by a skill developer. The skill developer can be a user (e.g., skill author expert) that is not associated with or directly controlling the skill developer system 120 (e.g., is not a user of the execution environment 180 coupled to the robotic control system 150). For example, the skill developer can define the behavior tree at a first location, and another user can provide a skill of the behavior tree to the skill developer system 120 at a second location as part of the skill configuration data 110. The behavior tree includes one or more skills, where each skill defines actions to be performed by a robot 170*a* of the execution environment 180.

The skill developer can define the skill to be associated with one or more safety constraints representing one or more safety conditions that must be satisfied for execution of the actions defined in the skill. For example, if the execution environment 180 is accessed by a human as part of the skill, the skill developer can define certain safety constraints in order to protect the human from the action being performed by one or more of the robots. In general, by defining safety constraints for the skill, the skill developer can ensure safety when other users use expert knowledge provided by the skill developer.

The skill developer system 120 can generate and provide the skill artifact 130 to the robotic control system 150 by processing the skill configuration data 110, and the robotic control system 150 executes the skill artifact 130 by issuing commands 152 to the execution environment 180 in order to drive the movements of the robots. In some cases, a user can directly provide the skill artifact 130 the robotics control system 150.

The skill developer can configure the skill to ensure safety through halting a control system from performing the tasks included in the skill using the one or more robots 170 if the robotics control system 150 does not meet certain safety conditions of the safety constraints. In particular, the skill developer can use a software development kit (SDK) for skills in order to write instructions (e.g., code) that define the operations of the skill and the safety constraints. For example, the skill developer can use an appropriate programming language, such as Python, C++, etc., to code instructions for operations of the skill artifact 130 and corresponding safety constraints. The safety constraints define a set of safety conditions that must be met in order to execute the skill artifact 130.

That is, the robotics control system 150 must meet the safety constraints included in the skill artifact 130 in order to execute the actions defined in the skill artifact 130. In particular, the robotics control system 150 populates a safety database (e.g., a safety critical database) with the safety constraints. The safety database can be a database of mappings between each of the actions included in the skill artifact 130 and one or more safety constraints. The safety constraints are associated with safety conditions that encode safety-critical requirements for each of the actions included in the skill, as described in further detail below with reference to FIG. 2.

In some cases, the robotics control system 150 tracks the safety database separately from the skill artifact 130. For example, if a user directly provides the skill artifact 130 to the robotics control system 150, and the skill artifact 130 was defined by another user, such as a skill developer, the robotics control system 150 can populate the safety database based on the safety constraints associated with the skill artifact 130 as defined by the skill developer.

The robotics control system 150 includes a safety control subsystem 184 configured to monitor the safety constraints associated with the skill artifact 130. The safety control subsystem 184 can monitor the safety constraints prior to execution and during execution.

In some implementations, the robotics control system 150 will refrain from executing the skill artifact 130 if the robotics control system 150 does not populate the safety database with the safety constraints prior to execution.

During execution, the safety control subsystem 184 can continuously monitor the actions of the robots 170 defined by the skill artifact 130 using one or more sensors of the execution environment 180.

For example, the safety control subsystem 184 can monitor the current position of each of the robots 170*a-n* and/or current motion parameters for each of the robots 170*a-n*, e.g., a current velocity, acceleration, and so on using one or more sensors of the execution environment 180. Instead or in addition, the safety control subsystem 184 can monitor a current status of the task being executed in the execution environment 180. Instead or in addition, the safety control subsystem 184 can monitor current values for respective parameters of the robots 170*a-n*, e.g., a current payload of a particular robot.

The safety control subsystem 184 can determine whether any of the safety conditions associated with the safety constraints have not been satisfied (e.g., whether any of the actions of the robots 170 violate the safety constraints).

In some implementations, the safety constraints can be volumetric constraints that do not allow entry into a particular volume of the execution environment 180. For example, execution of the skill artifact 130 can include a robot 170*a* performing a particular task within a specific volume, and the particular task can be mapped to a safety constraint within the safety critical database that disallows entry into the specific volume. If a human or another robot 170*b* enters or encroaches the specific volume, the safety control subsystem can determine that the safety constraint associated with the particular task is not being met.

In some implementations, the safety constraints can be kinematic constraints that do not allow the robot 170*a* to move outside of one or more parameters. In particular, the kinematic constraints may not allow a component of the robot 170*a* to outside a range of velocity, acceleration, jerk, torque, or force to perform the task or may not allow a load of the robot 170*a* to move at a certain velocity, acceleration, jerk, or torque to perform the task. For example, execution of the skill artifact 130 can include a robot 170*a* moving an object from one place to another, and the particular task can be mapped to a safety constraint within the safety critical database that disallows movement of a component of the robot 170*a*, the object, or both above a certain velocity, acceleration, jerk, or torque. If the component of the robot 170*a*, the object, or both move outside the specified limit parameters, the safety control subsystem can determine that the safety constraint associated with the particular task is not being met.

As a result of determining that one or more safety constraints are not being met, the robotics control system 150 can modify the execution defined by the skill artifact 130. In particular, the robotics control system 150 can modify one or more actions defined by the skill artifact 130. In some cases, the robotics control system 150 can inform a user that one or more of the safety constraints have been violated by one or more actions of the execution of the skill artifact 130.

In some implementations, the robotics control system 150 can modify the execution by halting the execution of the robot 170*a*. For example, the robotic controls system 150 can bring the robot 170*a* to a stop, and in some cases, the robotic control system 150 can ensure the avoidance of any obstacles while bringing the robot 170*a* to a stop. In some cases, the robotics control system 150 can bring the robot 170*a* to a stop in the shortest amount of time feasible In some other implementations, the robotics control system 150 can modify the execution by performing a recovery action. For example, the robotics control system 150 can perform a recovery action by executing a movement that the particular robot 170*a-n* can perform at a particular time point in order to ensure a safe environment within the execution environment 180, e.g., in order to avoid a collision with the other robots 170*a-n*, with other objects, or with a human within the execution environment 180.

In some cases, the robotics control system 150 can perform a recovery action by initiating a movement of a robot 170*a* that is currently stationary in the execution environment 180 to move out of the way of another robot 170*b* in the execution environment 180.

In some examples, when the robotic control system determines that a safety constraint is not met, the robotic control system 150 can cede control of the execution environment 180 to the emergency control system 160. In response, the emergency control system 160 can cause the robots 170*a-n* to perform the modification of the skill artifact 130 (e.g., halting operation of the robot 170*a* or performing a recovery action of the robot 170*a*).

The emergency control system 160 can be separated from the robotic control system 150 to ensure that a failure in the robotic control system 150 does not also affect the emergency control system 160. For example, the emergency control system 160 can be hosted on different hardware than the robotic control system 150, so that if the robotic control system 150 experiences a hardware failure, then the emergency control system 160 can still take control of the execution environment 180.

In some implementations, the emergency control system 160 is a real-time system that must satisfy one or more hard time constraints in the control of the robots 170*a-n*. For example, a robot 170*a-n* may be required to execute a particular movement or provide a particular data packet to the emergency control system 160 at each of a sequence of cycles, e.g., cycles of 1, 10, 100, or 1000 milliseconds. That is, the emergency control system 160 may operate on a real-time control cycle.

Figure 2:
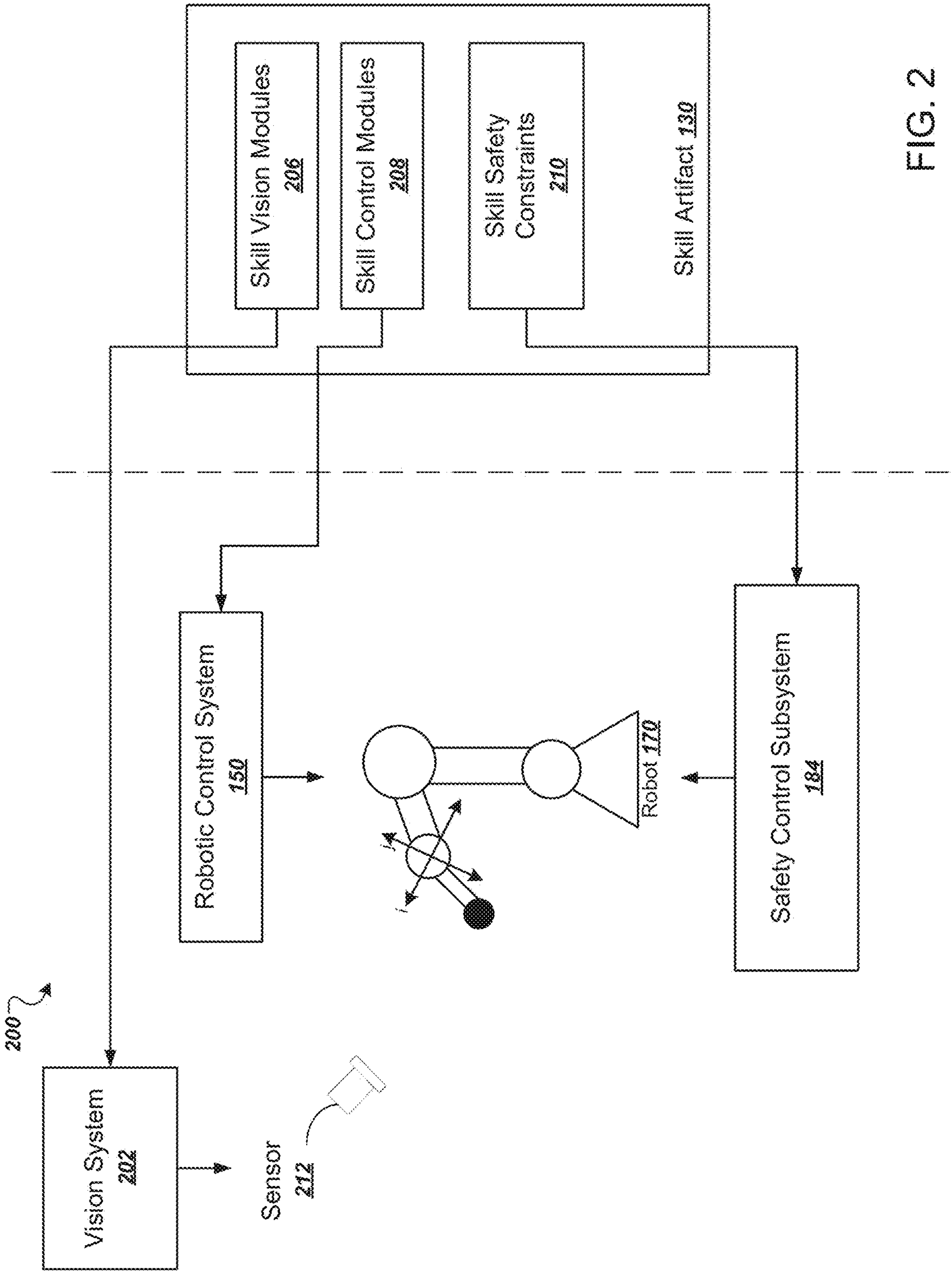
FIG. 2 illustrates example skill equipment matching for a robotic component operating in an execution environment.

FIG. 2 illustrates example skill equipment matching for a robotic component in an execution environment.

The skill artifact 130 for the robot can be generated by a skill developer system, e.g., the skill developer system 120 depicted in FIG. 1, or a user, such as a skill developer. The skill developer system or the user can provide the skill artifact 130 to a robotic control system, e.g., the robotic control system 150 depicted in FIG. 1, to execute the skill.

The skill artifact 130 includes skill vision modules 206 coupled to a vision system 202 of the execution environment, skill control modules 208 coupled to the robotic control system 150, and skill safety constraints 210 coupled to the safety control subsystem 184.

As described above, the robotic control system 150 populates a safety critical database with the actions included in the skill artifact 130, and the robotic control system 150 maps each action to one or more skill safety constraints 210 associated with one or more safety conditions. The robotic control system can then execute the skill artifact 130 while the safety control subsystem 184 monitors each of the actions and the safety constraints mapped to each action using the vision system 202.

In particular, the skill artifact 130 includes execution statements specified by the skill developer, which define conditions to be evaluated by the robotics control system 150. Additionally, the skill safety constraints 210 include safety consideration statements by a user which define conditions to be evaluated by the safety control subsystem 184, where the safety consideration statements can be mapped to one or more of the execution statements.

The robotic control system 150 can execute the skill artifact 130 based on each of the respective modules coupled to the respective systems. In particular, the skill control modules 208 include control information of the skill artifact 130 for the robotic controls system 150 to executed one or more actions by the robot 170. Additionally, the robotic control system 150 can use the safety control subsystem to continuously monitor the actions of the robot 170 during execution based on the skill safety constraints 210. The robotic control system 150, the safety control subsystem 184, or both, can process information of the skill vision modules 206 to use the vision system 202 for executing and monitoring of the actions of the robot 170.

In particular, the safety control subsystem 184 can use the sensor 212 of the vision system 202 to monitor volumetric constraints, kinematic constraints, or both based on the sensor readings of the sensor 212.

In some cases, as part of monitoring volumetric constraints, the safety control subsystem 184 can monitor the current position of the robot 170 and whether the robot 170, a user, or another robot enters a defined volume surrounding the robot 170 while the robot 170 is performing a task. For example, a user may enter the execution environment 180 while the robot 170 is performing a task part of the skill artifact 130 using a particular object, such as using a relatively hazardous tool (e.g., a knife, a hammer, etc.) to perform the task. The safety control subsystem 184 can detect that the user has entered the execution environment 180 using the sensor 212, and the safety control subsystem can modify execution of the task by halting the task, or in some cases, performing a recovery action, in order to ensure the safety of the user (e.g., to ensure the tool used by robot 170 does not come into contact with the user during the movement of the component). In this example, the recovery action can be for the safety control subsystem 184 to limit a volume of the movement of the robot 170 so as to not come into contact with the user.

In another example, another robot may enter the defined volume of the robot 170, and the safety control subsystem can modify execution of the skill artifact 130 by halting execution of either or both robots, or modifying a volume of the movement of either or both robots.

In some cases, as part of monitoring kinematic constraints, the safety control subsystem 184 can monitor the current motion parameters for the robot 170, such as a current velocity, acceleration, and so on. Instead of or in addition, the safety control subsystem 184 can monitor values for respective parameters of objects associated with the robot 170, such as a load of the robot 170. For example, the safety control subsystem 184 can detect that the robot 170 is moving at a higher velocity or at a higher level of kinematic energy than a threshold to perform a task of the artifact 130, such as moving an object from a first location to a second location of the execution environment, and the safety control subsystem 184 can halt the movement of the robot such that the robot 170 does not damage the object or cause the object to come into contact with another object.

The safety control subsystem 184 can determine whether any of the safety conditions associated with the safety constraints 210 have not been satisfied (e.g., whether any of the actions of the robots 170 violate the safety constraints). The skill safety constraints 210 are associated with safety conditions that encode safety-critical requirements for each of the actions included in the skill artifact 130.

The safety considerations statements can define static conditions or dynamic conditions of the execution. For example, a static condition can include for the robot 170 to move at or below a certain velocity, acceleration, jerk, or torque. In another example, a dynamic condition can include for the robot 170 to move at or a certain velocity, acceleration, jerk, or torque when performing a particular action using a particular robotic component of the robot 170, when performing the particular action at a certain time of day, or when performing the particular action on a particular object.

Figure 3:
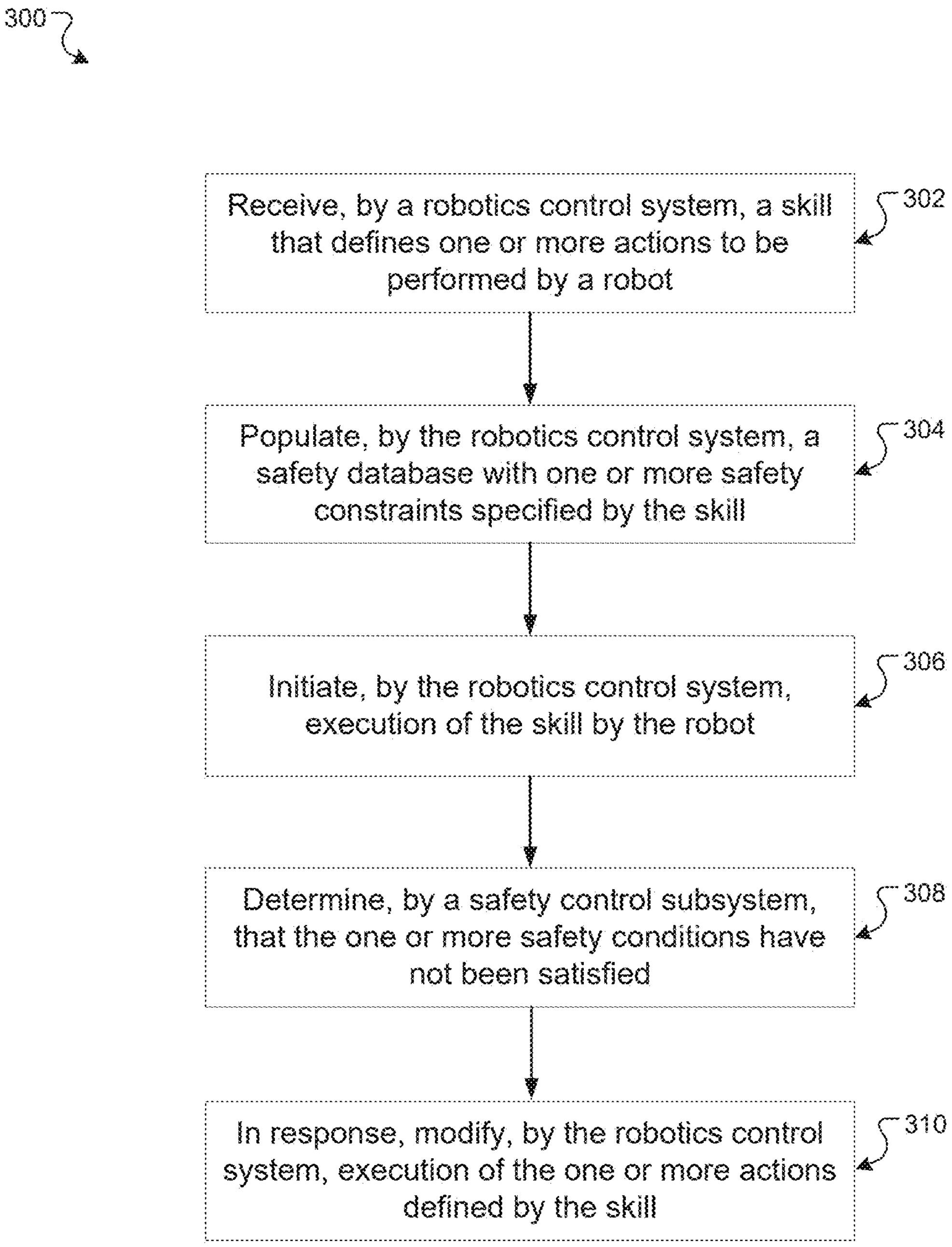
FIG. 3 is a flowchart of an example process for executing a skill for a robotic component in an execution environment.

FIG. 3 is a flowchart of an example process 300 for executing a skill for a robotic component in an execution environment. The process 300 can be implemented by one or more computer programs installed on one or more computers and programmed in accordance with this specification. For convenience, the process 300 will be described as being performed by a system of one or more computers. The system includes a robotic control system and an emergency control system. For example, the process 300 can be performed by the system 100 depicted in FIG. 1.

The system receives, by the robotics control system, a skill that defines one or more actions to be performed by the robot (step 302). The skill specifies one or more safety constraints that represent one or more safety conditions that must be satisfied before the robotics control system can execute the one or more actions on the robot.

In particular, the skill is a software artifact that provides commands that cause the robot to take action when executed by the robotics control system. The software artifact includes user-specified execution statements defining conditions to be evaluated by the robotics control system and user-specified safety consideration statements defining conditions to be evaluated by the safety control subsystem.

In some cases, the system can receive the skill from a skill developer entity that is a different entity than an entity operating the robotics control system. For example, the skill can be provided by the end-user of a robotic process, or by another developer.

The system populates, by the robotics control system, a safety database with one or more safety constraints specified by the skill (step 304). The safety constraints encode safety-critical requirements for the one or more actions of the skill.

In some cases, the safety constraints include one or more additional volume constraints that disallow entry into a particular volume of an operating environment. For example, a robot may be operating within a particular volume, and the additional volume constraints can disallow entry by a human or another robot into the particular volume.

In some cases, the safety constraints include one or more kinematic constraints that disallow moving the robot with one or more parameters of the movement of the robot or the velocity, acceleration, jerk, or torque. For example, a robot may be moving a robotic component or an object at a certain velocity, acceleration, jerk, or torque, and the kinematic constraints can disallow moving the robot or a load (e.g., an object) of the robot higher or lower than a specified velocity, acceleration, jerk, torque, or force range. Additionally, these constraints might be specified in the task space of the robot, or with respect to the pose of any part of the robot's kinematic model.

The system initiates, by the robotics control system, execution of the skill by the robot (step 306).

The system determines, by the safety control subsystem, that the one or more safety conditions have not been satisfied (step 308). The safety control subsystem continually checks the one or more safety conditions specified by the skill during execution of the skill by the robotics control system.

The system, in response, modifies, by the robotics control system, execution of the one or more actions defined by the skill (step 310). In particular, the system can modify execution of the one or more actions defined by the skill by halting execution of the robot or performing a recovery action. For example, the recovery action can include executing a movement of the robot to avoid collision with another robot in the execution environment.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term “data processing apparatus” refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an “engine,” or “software engine,” refers to a software implemented input/output system that provides an output that is different from the input. An engine can be an encoded block of functionality, such as a library, a platform, a software development kit (“SDK”), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a computer-implemented method comprising:

receiving, by a robotics control system, a skill that defines one or more actions to be performed by a robot controlled by the robotics control system,

- wherein the skill specifies one or more safety constraints that represent one or more safety conditions that must be satisfied before the robotics control system can execute the one or more actions on the robot;
- populating, by the robotics control system, a safety database with the one or more safety constraints specified by the skill;
- initiating, by the robotics control system, execution of the skill by the robot;
- determining, by a safety control subsystem of the robotics control system, that the one or more safety conditions specified by the skill have not been satisfied; and
- in response, modifying, by the robotics control system, execution of the one or more actions defined by the skill.

Embodiment 2 is the method of embodiment 1, wherein the safety control subsystem continually checks the one or more safety conditions specified by the skill during execution of the skill by the robotics control system.

Embodiment 3 is the method of embodiment 1, wherein the one or more safety conditions encode safety-critical requirements for the one or more actions of the skill.

Embodiment 4 is the method of embodiment 1, wherein the one or more safety constraints comprise one or more additional volume constraints that disallow entry into a particular volume of an operating environment.

Embodiment 5 is the method of embodiment 4, wherein the one or more additional volume constraints disallow entry into the particular volume by a human or a robot.

Embodiment 6 is the method of embodiment 1, wherein the one or more safety constraints comprises one or more kinematic or dynamic constraints that disallow moving the robot with one or more parameters.

Embodiment 7 is the method of embodiment 6, wherein the one or more kinematic or dynamic constraints disallow moving a component of the robot or a load of the robot at a particular velocity, acceleration, jerk, or torque.

Embodiment 8 is the method of embodiment 1, wherein modifying execution of the one or more actions comprises halting execution of the robot.

Embodiment 9 is the method of embodiment 1, wherein modifying execution of the one or more actions comprises performing a recovery action.

Embodiment 10 is the method of embodiment 1, wherein the skill is received from a skill developer entity.

Embodiment 11 is the method of embodiment 10, wherein the skill developer entity is a different entity than an entity operating the robotics control system.

Embodiment 12 is the method of embodiment 1, wherein the skill is a software artifact that, when executed by the robotics control system using the robot, implements the one or more actions of the skill.

Embodiment 13 is the method of embodiment 12, wherein the software artifact includes user-specified execution statements defining conditions to be evaluated by the robotics control system and user-specified safety consideration statements defining conditions to be evaluated by the safety control subsystem.

Embodiment 14 is a system comprising:

- receiving, by a robotics control system, a skill that defines one or more actions to be performed by a robot controlled by the robotics control system,
- wherein the skill specifies one or more safety constraints that represent one or more safety conditions that must be satisfied before the robotics control system can execute the one or more actions on the robot;
- populating, by the robotics control system, a safety database with the one or more safety constraints specified by the skill;
- initiating, by the robotics control system, execution of the skill by the robot;
- determining, by a safety control subsystem of the robotics control system, that the one or more safety conditions specified by the skill have not been satisfied; and
- in response, modifying, by the robotics control system, execution of the one or more actions defined by the skill.

Embodiment 15 is the system of embodiment 14, wherein the safety control subsystem continually checks the one or more safety conditions specified by the skill during execution of the skill by the robotics control system.

Embodiment 16 is the system of embodiment 14, wherein the one or more safety conditions encode safety-critical requirements for the one or more actions of the skill.

Embodiment 17 is the system of embodiment 14, wherein the one or more safety constraints comprise one or more additional volume constraints that disallow entry into a particular volume of an operating environment.

Embodiment 18 is the one or more non-transitory computer storage media encoded with computer program instructions when executed by a plurality of computers cause the plurality of computers to perform operations comprising:

receiving, by a robotics control system, a skill that defines one or more actions to be performed by a robot controlled by the robotics control system,

- wherein the skill specifies one or more safety constraints that represent one or more safety conditions that must be satisfied before the robotics control system can execute the one or more actions on the robot;
- populating, by the robotics control system, a safety database with the one or more safety constraints specified by the skill;
- initiating, by the robotics control system, execution of the skill by the robot;
- determining, by a safety control subsystem of the robotics control system, that the one or more safety conditions specified by the skill have not been satisfied; and
- in response, modifying, by the robotics control system, execution of the one or more actions defined by the skill.

Embodiment 19 is the non-transitory computer storage media of embodiment 18, wherein the safety control subsystem continually checks the one or more safety conditions specified by the skill during execution of the skill by the robotics control system.

Embodiment 20 is the non-transitory computer storage media of embodiment 18, wherein the one or more safety conditions encode safety-critical requirements for the one or more actions of the skill.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:

receiving, by a robotics control system, a skill that defines one or more actions to be performed by a robot controlled by the robotics control system, wherein the skill is received from a skill developer entity, wherein the skill is a software artifact that, when executed by the robotics control system using the robot, implements the one or more actions of the skill, wherein the software artifact includes user-specified execution statements defining a plurality of safety conditions to be evaluated by the robotics control system and user-specified safety consideration statements defining a plurality of safety conditions to be evaluated by the safety control subsystem, wherein the skill specifies one or more safety constraints that represent one or more safety conditions that must be satisfied before the robotics control system can execute the one or more actions on the robot, the one or more safety conditions including (i) one or more safety conditions of the plurality of safety conditions be evaluated by the robotics control system, (ii) one or more safety conditions of the plurality of safety conditions to be evaluated by the safety control subsystem, or (iii) both;

populating, by the robotics control system, a safety database with the one or more safety constraints specified by the skill;

initiating, by the robotics control system, execution of the skill by the robot;

determining, by a safety control subsystem of the robotics control system, that the one or more safety conditions specified by the skill have not been satisfied; and in response, modifying, by the robotics control system, execution of the one or more actions defined by the skill.

2. The method of claim 1, wherein the safety control subsystem continually checks the one or more safety conditions specified by the skill during execution of the skill by the robotics control system.

3. The method of claim 1, wherein the one or more safety conditions encode safety-critical requirements for the one or more actions of the skill.

4. The method of claim 1, wherein the one or more safety constraints comprise one or more additional volume constraints that disallow entry into a particular volume of an operating environment.

5. The method of claim 4, wherein the one or more additional volume constraints disallow entry into the particular volume by a human or a robot.

6. The method of claim 1, wherein the one or more safety constraints comprises one or more kinematic or dynamic constraints that disallow moving the robot with one or more parameters.

7. The method of claim 6, wherein the one or more kinematic or dynamic constraints disallow moving a component of the robot or a load of the robot at a particular velocity, acceleration, jerk, or torque.

8. The method of claim 1, wherein modifying execution of the one or more actions comprises halting execution of the robot.

9. The method of claim 1, wherein modifying execution of the one or more actions comprises performing a recovery action.

10. The method of claim 1, wherein the skill developer entity is a different entity than an entity operating the robotics system.

11. The method of claim 1, wherein the skill developer entity is different from an entity operating the robotics control system.

12. The method of claim 1, wherein the skill developer entity comprises at least one of a human developer or an organizational entity.

13. The method of claim 1, wherein the skill developer entity comprises one or more computing systems configured to define the skill.

14. A system comprising one or more computers and one or more storage devices storing instructions that are operable, when executed by the one or more computers, to cause the one or more computers to perform operations comprising:

receiving, by a robotics control system, a skill that defines one or more actions to be performed by a robot controlled by the robotics control system, wherein the skill is received from a skill developer entity, wherein the skill is a software artifact that, when executed by the robotics control system using the robot, implements the one or more actions of the skill, wherein the software artifact includes user-specified execution statements defining a plurality of safety conditions to be evaluated by the robotics control system and user-specified safety consideration statements defining a plurality of safety conditions to be evaluated by the safety control subsystem, wherein the skill specifies one or more safety constraints that represent one or more safety conditions that must be satisfied before the robotics control system can execute the one or more actions on the robot, the one or more safety conditions including (i) one or more safety conditions of the plurality of safety conditions be evaluated by the robotics control system, (ii) one or more safety conditions of the plurality of safety conditions to be evaluated by the safety control subsystem, or (iii) both;

populating, by the robotics control system, a safety database with the one or more safety constraints specified by the skill;

initiating, by the robotics control system, execution of the skill by the robot;

determining, by a safety control subsystem of the robotics control system, that the one or more safety conditions specified by the skill have not been satisfied; and in response, modifying, by the robotics control system, execution of the one or more actions defined by the skill.

15. The system of claim 14, wherein the safety control subsystem continually checks the one or more safety conditions specified by the skill during execution of the skill by the robotics control system.

16. The system of claim 14, wherein the one or more safety conditions encode safety-critical requirements for the one or more actions of the skill.

17. The system of claim 14, wherein the one or more safety constraints comprise one or more additional volume constraints that disallow entry into a particular volume of an operating environment.

18. One or more non-transitory computer storage media encoded with computer program instructions that when executed by a plurality of computers cause the plurality of computers to perform operations comprising:

receiving, by a robotics control system, a skill that defines one or more actions to be performed by a robot controlled by the robotics control system, wherein the skill is received from a skill developer entity, wherein the skill is a software artifact that, when executed by the robotics control system using the robot, implements the one or more actions of the skill, wherein the software artifact includes user-specified execution statements defining a plurality of safety conditions to be evaluated by the robotics control system and user-specified safety consideration statements defining a plurality of safety conditions to be evaluated by the safety control subsystem, wherein the skill specifies one or more safety constraints that represent one or more safety conditions that must be satisfied before the robotics control system can execute the one or more actions on the robot, the one or more safety conditions including (i) one or more safety conditions of the plurality of safety conditions be evaluated by the robotics control system, (ii) one or more safety conditions of the plurality of safety conditions to be evaluated by the safety control subsystem, or (iii) both;

populating, by the robotics control system, a safety database with the one or more safety constraints specified by the skill;

initiating, by the robotics control system, execution of the skill by the robot;

determining, by a safety control subsystem of the robotics control system, that the one or more safety conditions specified by the skill have not been satisfied; and in response, modifying, by the robotics control system, execution of the one or more actions defined by the skill.

19. The non-transitory computer storage media of claim 18, wherein the safety control subsystem continually checks the one or more safety conditions specified by the skill during execution of the skill by the robotics control system.

20. The non-transitory computer storage media of claim 18, wherein the one or more safety conditions encode safety-critical requirements for the one or more actions of the skill.

* * * * *